(12) United States Patent
Tsai

(10) Patent No.: US 8,870,505 B2
(45) Date of Patent: Oct. 28, 2014

(54) RIVETING ASSEMBLY

(71) Applicant: Chicony Electronics Co., Ltd., New Taipei (TW)

(72) Inventor: Ching-Cheng Tsai, Keelung (TW)

(73) Assignee: Chicony Electronics Co., Ltd., New Taipei (TW)

( * ) Notice: Subject to any disclaimer, the term of this patent is extended or adjusted under 35 U.S.C. 154(b) by 77 days.

(21) Appl. No.: 13/687,592

(22) Filed: Nov. 28, 2012

(65) Prior Publication Data

US 2014/0079505 A1    Mar. 20, 2014

(30) Foreign Application Priority Data

Sep. 14, 2012    (TW) .............................. 101217867 U

(51) Int. Cl.
*F16B 13/04*    (2006.01)

(52) U.S. Cl.
USPC ............................................ 411/34; 411/183

(58) Field of Classification Search
None
See application file for complete search history.

(56) References Cited

U.S. PATENT DOCUMENTS

| | | | | |
|---|---|---|---|---|
| 1,759,339 A | * | 5/1930 | Andren | 411/180 |
| 2,170,472 A | * | 8/1939 | Fitch | 29/509 |
| 3,276,499 A | * | 10/1966 | Reusser | 411/179 |
| 3,431,960 A | * | 3/1969 | Neuschotz | 411/180 |
| 3,534,936 A | * | 10/1970 | Knowlton | 248/653 |
| 3,948,142 A | * | 4/1976 | McKay et al. | 411/38 |
| 4,208,944 A | * | 6/1980 | Moryl | 411/34 |
| 5,423,645 A | * | 6/1995 | Muller et al. | 411/181 |

* cited by examiner

*Primary Examiner* — Gary Estremsky
(74) *Attorney, Agent, or Firm* — Michael A. Glenn; Perkins Coie LLP

(57) ABSTRACT

A riveting assembly includes a base plate and a stud. The base plate has a first surface, a second surface, and a riveting hole. The riveting hole is communicated with the first surface and the second surface and has at least one notch. The stud includes a main body and a riveting structure. The main body abuts against the second surface and covers the riveting hole. The riveting structure is connected to the main body. The riveting structure protrudes out from the riveting hole to abut against the first surface and to be engaged with the notch. A portion of the base plate is clamped between the main body and the riveting structure.

9 Claims, 5 Drawing Sheets

RIVETING ASSEMBLY

RELATED APPLICATIONS

This application claims priority to Taiwan Application Serial Number 101217867, filed Sep. 14, 2012, which is herein incorporated by reference.

BACKGROUND

1. Technical Field

The present disclosure relates to a riveting assembly, and more particularly, to a riveting assembly for combining a stud with a base plate.

2. Description of Related Art

In a conventional electronic product (e.g., a host computer, a DVD player, a VCD player, etc.) with a chassis structure, a fastening method is generally needed for fixing chassis plates to each other or to a circuit board. The fastening method forms threaded holes on the plates firstly, and then uses screws into the threaded holes for fastening. However, thickness of the chassis plates is generally small, so that the screws may easily escape from the threaded holes due to small contact areas between the screws and the chassis plates which result in weak connection strength. Therefore, a riveting method that has the advantages of strong connection strength and short processing time has gradually replaced the fastening method of using screws at certain occasions.

Currently, a riveting piece can be riveted to a workpiece by using various kinds of machines (such as a punching machine, a pressing machine, or a bending machine) collaborating with molds or gauges designed for the riveting piece and the workpiece. Whether the riveting piece can be well riveted to the workpiece is absolutely related to the material of the workpiece and the riveting position of the riveting piece relative to the workpiece. Accordingly, specifications of various riveting pieces all define a requirement of minimum distance between a centerline of riveting piece and an edge material at a riveting position. If a riveting piece does not meet the requirement, it can be assured that the riveting piece can't be well riveted. Furthermore, if the design fails to meet the requirement of minimum distance (between a centerline of riveting piece and an edge material at a riveting position), a secondary processing (such as traditional argon welding, laser welding, powerful adhesive, or other manners) has to be performed to enhance the fastening strength of the riveting piece.

However, a deformed portion of the riveting piece for being riveted to the workpiece may easily fall off from the workpiece while being rotated relative to the workpiece or deformed again due to an external impact. In other words, the conventional riveting manner cannot provide better anti-torque and anti-tensile capabilities.

SUMMARY

In order to solve the problems of the prior art, the disclosure provides an improved riveting assembly, in which a plurality of notches are formed at a riveting hole of a base plate of the riveting assembly. After a riveting piece passes through the riveting hole to be riveted to the base plate, portions of the riveting piece corresponding to the notches are stamped, thereby engaging the portions of the riveting piece with the notches. Therefore, when being impacted, the riveting piece will not be easily rotated relative to the base plate. In other words, the riveting assembly of the disclosure can provide better anti-torque capability between the riveting piece and the base plate. Furthermore, a secondary processing (i.e. a stamping process) can be performed onto the riveting piece after the riveting piece is riveted to the base plate, thereby further improving anti-tensile capability between the riveting piece and the base plate. In the disclosure, the riveting assembly primarily adopts a stud as the riveting piece.

According to an embodiment of the disclosure, a riveting assembly includes a base plate and a stud. The base plate has a first surface, a second surface, and a riveting hole. The riveting hole is communicated with the first surface and the second surface and has at least one notch. The stud includes a main body and a riveting structure. The main body abuts against the second surface and covers the riveting hole. The riveting structure is connected to the main body. The riveting structure protrudes out from the riveting hole to abut against the first surface and to be engaged with the notch. A portion of the base plate is clamped between the main body and the riveting structure.

In an embodiment of the disclosure, the riveting structure includes a first engaging portion, a riveting portion, and at least one second engaging portion. The first engaging portion is connected to the main body to be engaged with the riveting hole. The riveting portion is connected to the first engaging portion. The riveting portion protrudes out from the riveting hole and is bent relative to the first engaging portion to abut against the first surface. The portion of the base plate is clamped between the main body and the riveting portion. The second engaging portion is disposed on the riveting portion to be engaged with the notch.

In an embodiment of the disclosure, the second engaging portion is a stamped structure.

In an embodiment of the disclosure, the base plate includes a recessed region. The recessed region is recessed from the first surface toward the second surface, so as to form an accommodating space. The riveting hole is located in the recessed region. The accommodating space accommodates the riveting portion.

In an embodiment of the disclosure, the recessed region has an opening. The riveting portion does not protrude out from the opening.

In an embodiment of the disclosure, the second engaging portion is located at a junction of the first engaging portion and the riveting portion.

In an embodiment of the disclosure, the stud has a threaded hole and a countersunk hole. The threaded hole passes through the main body. The countersunk hole passes through the riveting structure. The threaded hole and the countersunk hole are communicated with each other.

In an embodiment of the disclosure, a diameter of the threaded hole is smaller than a diameter of the countersunk hole.

In an embodiment of the disclosure, the base plate includes a plurality of the notches. The notches are formed at an inner wall of the riveting hole equidistantly.

In an embodiment of the disclosure, the riveting hole is substantially star-shaped.

In an embodiment of the disclosure, the riveting structure includes at least one protrusion corresponding to the notch.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
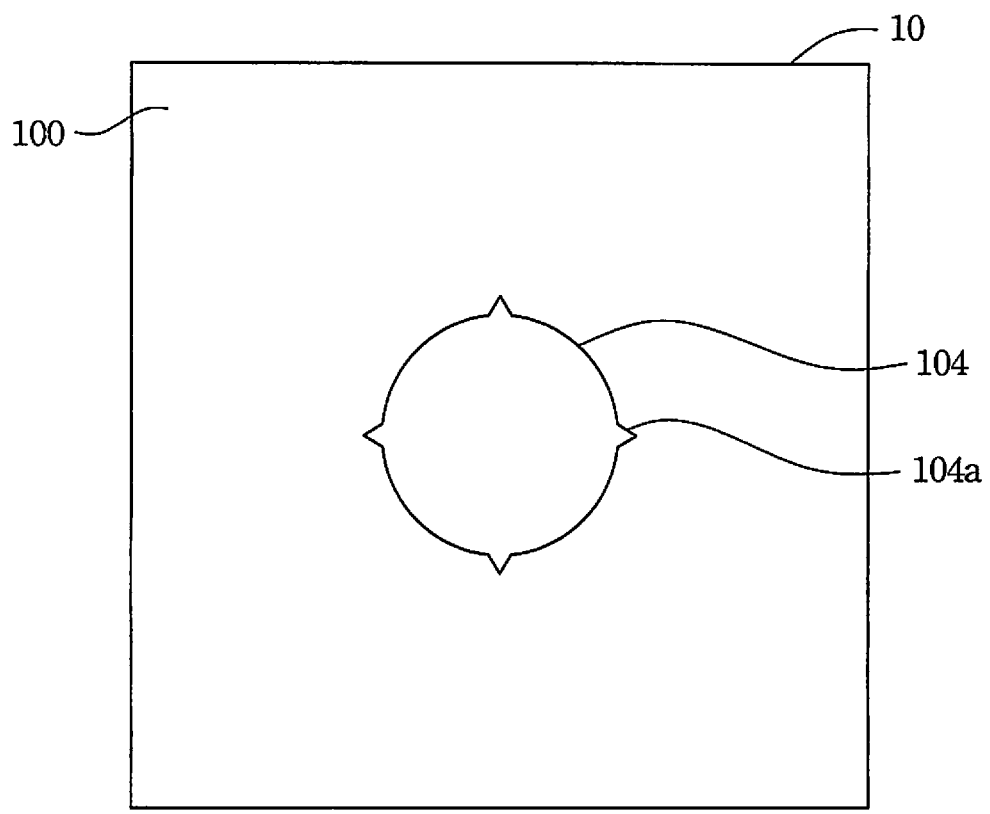
FIG. 1 is a top view of a base plate of a riveting assembly according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2A:
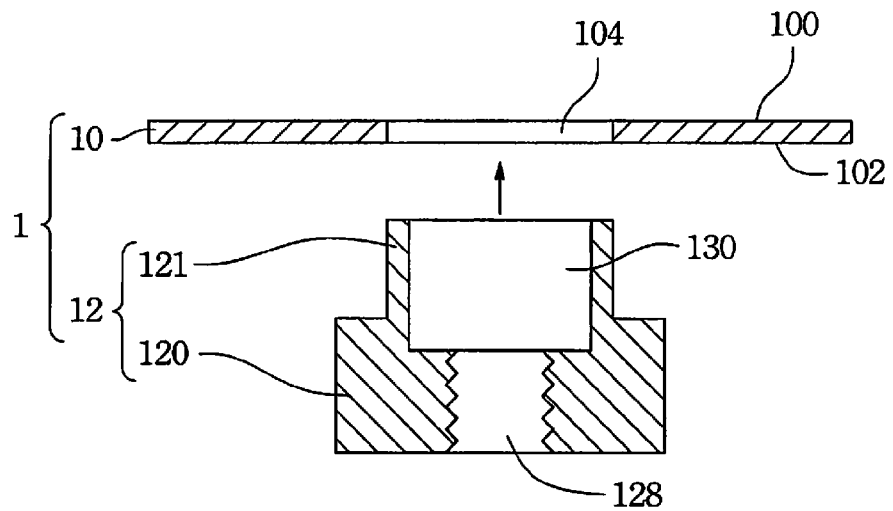
FIG. 2A is a cross-sectional view of the riveting assembly according to an embodiment of the disclosure, in which a stud has not been engaged with the base plate.

FIG. 1 is a top view of a base plate 10 of a riveting assembly 1 according to an embodiment of the disclosure. FIG. 2A is a cross-sectional view of the riveting assembly 1 according to an embodiment of the disclosure, in which a stud 12 has not been engaged with the base plate 10.

As shown in FIG. 1 and FIG. 2A, the riveting assembly 1 of the disclosure firmly fixes the stud 12 to the base plate 10, but the disclosure is not limited in this regard. For example, concepts of the riveting assembly 1 can be applied to an electronic product having a chassis structure (such as a host computer, a DVD player, a VCD player, etc.) for firmly connecting two plates of the chassis structure or connecting a circuit board to one of the plates. In other words, if there exists a requirement of firmly connecting and fixing two independent objects, the concepts of the riveting assembly 1 of the disclosure can be used.

As shown in FIG. 1 and FIG. 2A, the riveting assembly 1 includes the base plate 10 and the stud 12. The base plate 10 of the riveting assembly 1 has a first surface 100, a second surface 102, and a riveting hole 104. The riveting hole 104 of the base plate 10 is communicated with the first surface 100 and the second surface 102 and has a plurality of notches 104a. In the embodiment of the disclosure, the riveting hole 104 of the base plate 10 has four notches 104a, and the notches 104a are formed at the inner wall of the riveting hole 104 equidistantly, but the disclosure is not limited in this regard. The number of the notches 104a of the riveting hole 104 and locations of the notches 104a relative to the riveting hole 104 can be adjusted as needed. Furthermore, in the embodiment of the disclosure, the riveting hole 104 of the base plate 10 is substantially star-shaped, but the disclosure is not limited in this regard. The shapes of the notches 104a of the riveting hole 104 can also be adjusted as needed.

As shown in FIG. 2A, the stud 12 of the riveting assembly 1 includes a main body 120 and a riveting structure 121. The stud 12 of the riveting assembly 1 has a threaded hole 128 and a countersunk hole 130. The threaded hole 128 of the stud 12 passes through the main body 120. The countersunk hole 130 of the stud 12 passes through the riveting structure 121. The threaded hole 128 and the countersunk hole 130 are communicated with each other, and the diameter of the threaded hole 128 is smaller than the diameter of the countersunk hole 130. Therefore, when a screw having a threaded portion and a head portion (not shown) is fastened to the stud 12 of the riveting assembly 1, the threaded portion of the screw can enter the countersunk hole 130 and then be fastened into the threaded hole 128. After the screw is entirely fastened to the stud 12, the countersunk hole 130 of the stud 12 accommodates the head portion of the screw.

Figure 2B:
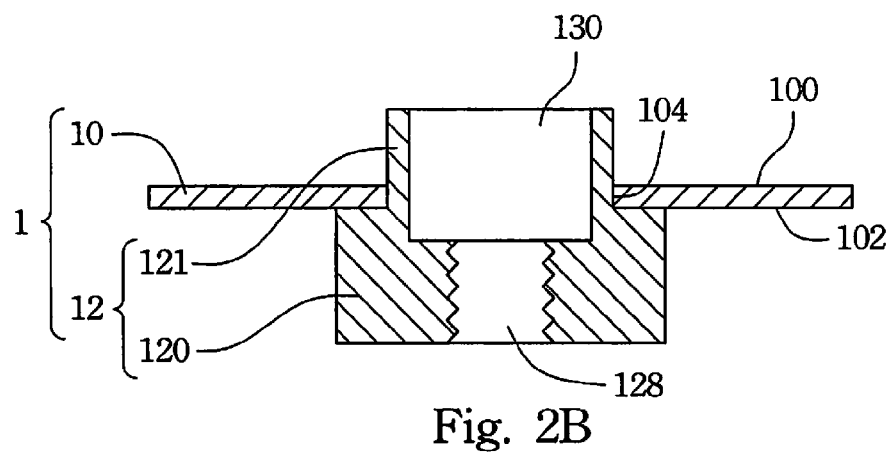
FIG. 2B is another cross-sectional view of the riveting assembly in FIG. 2A, in which the stud has been engaged with the base plate.

FIG. 2B is another cross-sectional view of the riveting assembly 1 in FIG. 2A, in which the stud 12 has been engaged with the base plate 10.

As shown in FIG. 2A and FIG. 2B, the outer diameter of the riveting structure 121 of the stud 12 is equal to or smaller than the inner diameter of the riveting hole 104. Therefore, the riveting structure 121 of the stud 12 can be aligned with the riveting hole 104 of the base plate 10 firstly, and then the stud 12 can be moved toward the base plate 10 (as shown in FIG. 2A), so as to make the riveting structure 121 pass through the riveting hole 104 from the second surface 102 of the base plate 10 and be engaged with the riveting hole 104. For convenient assembling, a small clearance is allowed between the riveting structure 121 of the stud 12 and the riveting hole 104 of the base plate 10. Furthermore, the outer diameter of the main body 120 of the stud 12 is greater than the outer diameter of the riveting structure 121. Therefore, when the riveting structure 121 of the stud 12 passes through the riveting hole 104 of the base plate 10 till abutting against the second surface 102 of the base plate 10, the main body 120 covers the riveting hole 104 (as shown in FIG. 2B). Meanwhile, the riveting structure 121 of the stud 12 protrudes out of the riveting hole 104 of the base plate 10 from the first surface 100.

Figure 2C:
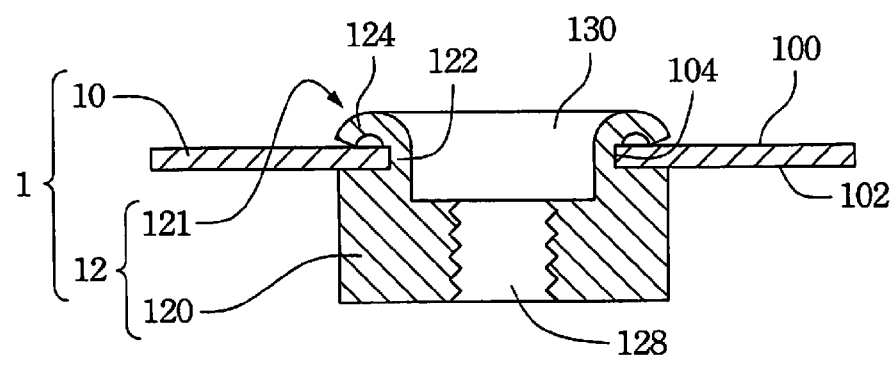
FIG. 2C is another cross-sectional view of the riveting assembly in FIG. 2A, in which the stud has been riveted to the base plate.

FIG. 2C is another cross-sectional view of the riveting assembly 1 in FIG. 2A, in which the stud 12 has been riveted to the base plate 10.

As shown in FIG. 2C, in order to rivet the base plate 10 and the stud 12 that have been engaged with each other, the riveting structure 121 that protrudes out of the riveting hole 104 of the base plate 10 from the first surface 100 can be stamped so as to make the portion of the riveting structure 121 that protrudes out of the riveting hole 104 of the base plate 10 be deformed to abut against the first surface 100 of the base plate 10. Meanwhile, the outer diameter of the portion of the riveting structure 121 that is deformed is greater than the inner diameter of the riveting hole 104, such that the riveting structure 121 cannot return to the second surface 102 of the base plate 10 via the riveting hole 104. Therefore, a portion of the base plate 10 can be firmly clamped between the main body 120 and the riveting structure 121 of the stud 12.

Furthermore, the riveting structure 121 of the stud 12 includes a first engaging portion 122 and a riveting portion 124. The first engaging portion 122 of the riveting structure 121 is connected to the main body 120, so as to be engaged with the riveting hole 104 of the base plate 10. In other words, when the riveting structure 121 of the stud 12 passes through the riveting hole 104 of the base plate 10 till abutting against the second surface 102 of the base plate 10, the first engaging portion 122 of the riveting structure 121 is engaged with the riveting hole 104 of the base plate 10. The riveting portion 124 of the riveting structure 121 is connected to the first engaging portion 122. When the riveting structure 121 of the stud 12 passes through the riveting hole 104 of the base plate 10 till abutting against the second surface 102 of the base plate 10, the riveting portion 124 of the riveting structure 121 protrudes out of the riveting hole 104 of the base plate 10 and is bent relative to the first engaging portion 122 to abut against the first surface 100. Therefore, the portion of the base plate 10 can be firmly clamped between the main body 120 of the stud 12 and the riveting portion 124 of the riveting structure 121.

Figure 3:
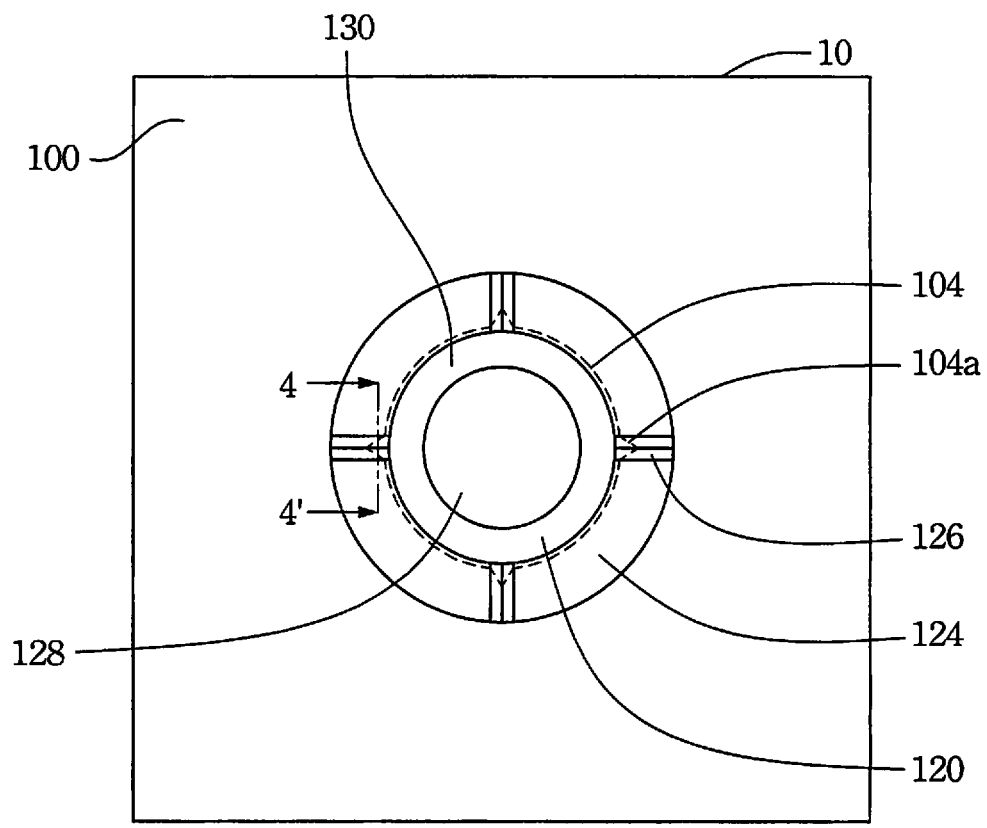
FIG. 3 is a top view of the riveting assembly in FIG. 2C, in which a riveting hole is indicated by a dotted line.
Figure 4:
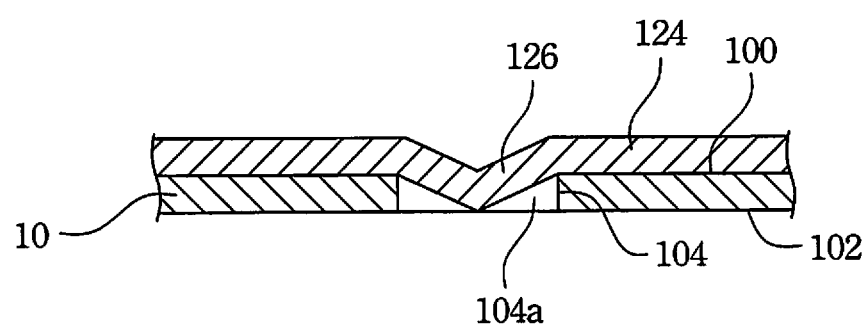
FIG. 4 is a cross-sectional view viewed along line 4-4' of FIG. 3.

FIG. 3 is a top view of the riveting assembly 1 in FIG. 2C, in which the riveting hole 104 is indicated by a dotted line. FIG. 4 is a cross-sectional view viewed along line 4-4' of FIG. 3.

As shown in FIG. 3 and FIG. 4, the riveting structure 121 of the stud 12 further includes a plurality of second engaging portions 126. The second engaging portions 126 are located on the riveting portion 124 (i.e., the portion of the riveting structure 121 that protrudes out of the riveting hole 104 of the base plate 10 and is deformed to abut against the first surface 100), so as to be engaged with the notches 104a of the riveting hole 104. In order to form the second engaging portions 126 on the riveting portion 124 of the riveting structure 121, the stud 12 can be performed with a secondary processing (such as a stamping process) after the stud 12 and the base plate 10 are riveted to each other. In the embodiment of the disclosure, the second engaging portions 126 of the riveting structure 121 are stamped structures located on the riveting portion 124. By performing the secondary processing onto the riveting portion 124 of the riveting structure 121, stress concentrations generated on the riveting portion 124 can further improve the anti-tensile capability of the stud 12 of the riveting assembly 1 relative to base plate 10.

As shown in FIG. 3, the second engaging portions 126 of the riveting structure 121 are formed from the inner edge of the riveting portion 124 (i.e., the junction of the first engaging portion 122 and the riveting portion 124) toward the outer edge of the riveting portion 124, but the disclosure is not limited in this regard. In another embodiment of the disclosure, the second engaging portions 126 of the riveting structure 121 are located at the junction of the first engaging portion 122 and the riveting portion 124, and each of the second engaging portions 126 is aligned with and engaged with a corresponding one of the notches 104a at the riveting hole 104.

Figure 5:
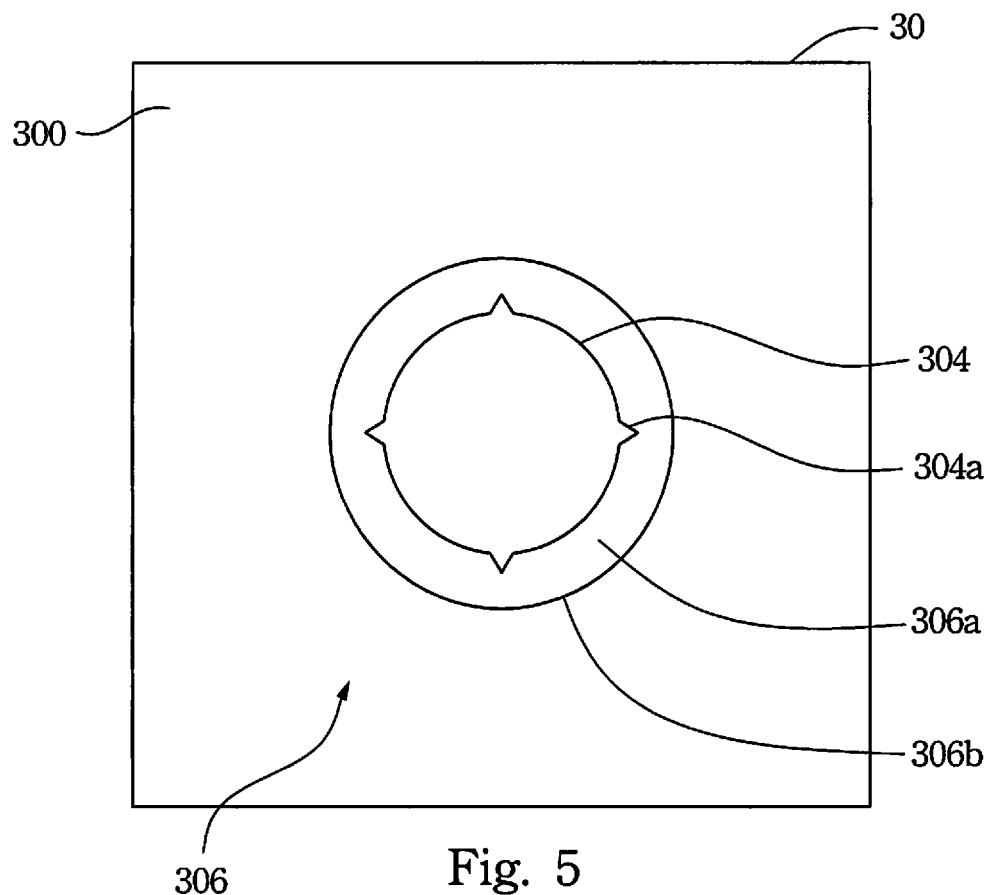
FIG. 5 is a top view of a base plate of a riveting assembly according to another embodiment of the disclosure.
Figure 6:
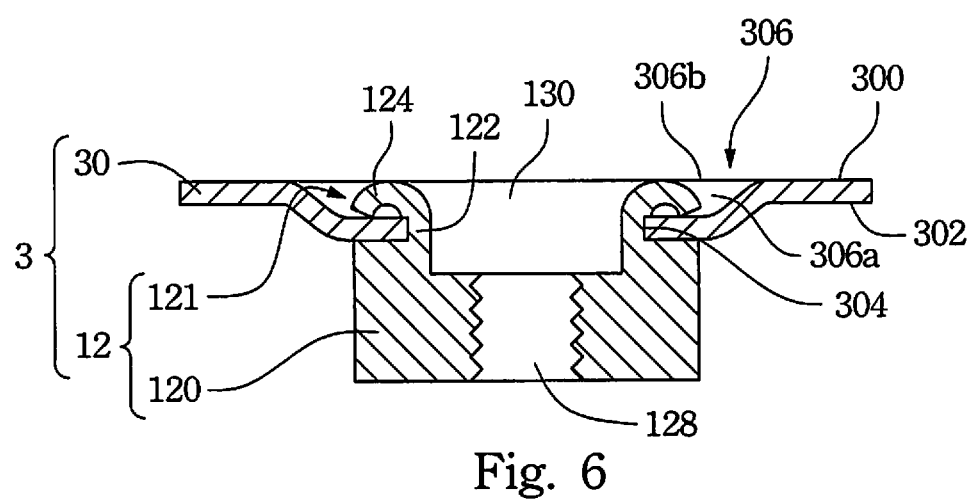
FIG. 6 is a cross-sectional view of the riveting assembly according to another embodiment of the disclosure, in which a stud has been riveted to the base plate.

FIG. 5 is a top view of a base plate 30 of a riveting assembly 3 according to another embodiment of the disclosure. FIG. 6 is a cross-sectional view of the riveting assembly 3 according to another embodiment of the disclosure, in which a stud 12 has been riveted to the base plate 30.

As shown in FIG. 5 and FIG. 6, the riveting structure 3 includes a base plate 30 and a stud 12. The structure and functions of the stud 12 of the riveting assembly 3 can be referred to the related descriptions of the above embodiment shown in FIG. 2A to FIG. 2C, and thus an explanation in this regard will not be repeated. The base plate 30 of the riveting assembly 3 has a first surface 300, a second surface 302, and a riveting hole 304. The riveting hole 304 of the base plate 30 is communicated with the first surface 300 and the second surface 302 and has a plurality of notches 304a. The structures and functions of the first surface 300, the second surface 302, the riveting hole 304, and the notches 304a and relationships among them can be referred to the above embodiment shown in FIG. 1, FIG. 3, and FIG. 4, and thus an explanation in this regard will not be repeated.

It should be pointed out that in the embodiment of the disclosure, the base plate 30 of the riveting assembly 3 further includes a recessed region 306. The recessed region 306 of the base plate 30 is recessed from the first surface 300 toward the second surface 302, so as to form an accommodating space 306a. The riveting hole 304 of the base plate 30 is located in the recessed region 306. The accommodating space 306a of the base plate 30 accommodates the riveting portion 124 of the riveting structure 121. Furthermore, the recessed region 306 of the base plate 30 has an opening 306b. The riveting portion 124 of the riveting structure 121 does not protrude out from the opening 306b. In other words, after the stud 12 is riveted to the base plate 30, and the riveting portion 124 of the riveting structure 121 is accommodated in the accommodating space 306a of the recessed region 306 without protruding out of the opening 306b. Therefore, the riveting portion 124 of the riveting structure 121 is not easy to be impacted by external force, so as to prevent the riveting portion 124 from being deformed again back to the second surface 302 of the base plate 30 via the riveting hole 304 and thus being separated from the base plate 30.

In practice, the recessed region 306 of the base plate 30 can be formed by stamping in advance or be simultaneously formed when the riveting portion 124 of the riveting structure 121 is riveted to the base plate 30 (as shown in FIG. 2C) by stamping.

Figure 7:
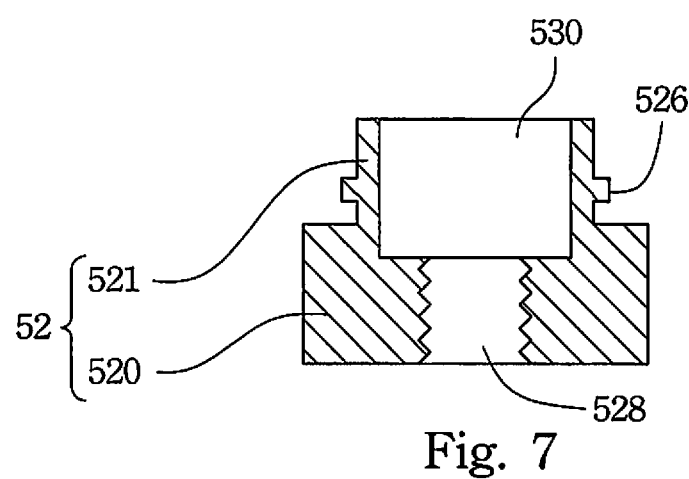
FIG. 7 is a cross-sectional view of another embodiment of the stud in FIG. 2A.

FIG. 7 is a cross-sectional view of another embodiment of the stud 12 in FIG. 2A.

As shown in FIG. 7, a stud 52 also includes a main body 520 and a riveting structure 52, and the stud 52 also has a threaded hole 528 and a countersunk hole 530, in which reference can be made to the related descriptions of the stud 12 shown in FIG. 2A, and thus an explanation in this regard will not be repeated. It should be pointed out that in the embodiment of the disclosure, the riveting structure 521 of the stud 52 includes a plurality of protrusions 526 located at the outer wall of the riveting structure 521, and each of the protrusions 526 is corresponding to one of the notches 104a of the riveting hole 104.

Therefore, after the riveting structure 521 of the stud 52 passes through the riveting hole 104 from the second surface 102 of the base plate 10 and is engaged with the riveting hole 104, the protrusions 526 of the riveting structure 521 are engaged with the notches 104a of the riveting hole 104.

According to the foregoing recitations of the embodiments of the disclosure, it can be seen that the riveting assembly forms a plurality of notches at a riveting hole of a base plate. After a riveting piece passes through the riveting hole to be riveted to the base plate, portions of the riveting piece corresponding to the notches are stamped, so as to make the portions be engaged with the notches. Therefore, the riveting piece is not easily to be rotated relative to the base plate by impact. In other words, the riveting assembly of the disclosure can provide better anti-torque capability between the riveting piece and the base plate. Furthermore, the secondary processing (i.e. the stamping process) performed onto the riveting piece after the riveting piece is riveted to the base plate can further improve the anti-tensile capability between the riveting piece and the base plate.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A riveting assembly, comprising:
   a base plate having a first surface, a second surface, and a riveting hole, the riveting hole being communicated with the first surface and the second surface and having at least one notch; and
   a stud, comprising:
     a main body abutting against the second surface and covering the riveting hole; and
     a riveting structure connected to the main body, the riveting structure protruding out from the riveting hole to abut against the first surface and to be engaged with the notch, wherein a portion of the base plate is clamped between the main body and the riveting structure, wherein the riveting structure comprises:
a first engaging portion connected to the main body to be engaged with the riveting hole;
a riveting portion which is connected to the first engaging portion, protrudes out from the riveting hole, and is bent relative to the first engaging portion to abut against the first surface, wherein the portion of the base plate is clamped between the main body and the riveting portion; and
at least one second engaging portion disposed on the riveting portion to be engaged with the notch, wherein the second engaging portion is a stamped structure which has a convex surface and a concave surface respectively located at two opposite sides of the second engaging portion and aligned with each other, the convex surface is engaged into the notch, and the concave surface faces away from the notch.

2. The riveting assembly of claim 1, wherein the base plate comprises a recessed region recessed from the first surface toward the second surface, so as to form an accommodating space, the riveting hole is located in the recessed region, and the accommodating space accommodates the riveting portion.

3. The riveting assembly of claim 2, wherein the recessed region has an opening, and the riveting portion does not protrude out of the opening.

4. The riveting assembly of claim 1, wherein the second engaging portion is located at a junction of the first engaging portion and the riveting portion.

5. The riveting assembly of claim 1, wherein the stud has a threaded hole and a countersunk hole, the threaded hole passes through the main body, the countersunk hole passes through the riveting structure, and the threaded hole and the countersunk hole are communicated with each other.

6. The riveting assembly of claim 5, wherein a diameter of the threaded hole is smaller than a diameter of the countersunk hole.

7. The riveting assembly of claim 1, wherein the base plate comprises a plurality of the notches formed at an inner wall of the riveting hole equidistantly.

8. The riveting assembly of claim 1, wherein the riveting hole is substantially star-shaped.

9. The riveting assembly of claim 1, wherein the riveting structure comprises at least one protrusion corresponding to the notch.

* * * * *